(12) United States Patent
Gozu

(10) Patent No.: US 12,134,231 B2
(45) Date of Patent: Nov. 5, 2024

(54) PLASTICIZING DEVICE, THREE-DIMENSIONAL SHAPING APPARATUS, AND INJECTION MOLDING APPARATUS

(71) Applicant: SEIKO EPSON CORPORATION, Tokyo (JP)

(72) Inventor: Masayuki Gozu, Ina (JP)

(73) Assignee: Seiko Epson Corporation, Tokyo (JP)

( * ) Notice: Subject to any disclaimer, the term of this patent is extended or adjusted under 35 U.S.C. 154(b) by 45 days.

(21) Appl. No.: 17/806,795

(22) Filed: Jun. 14, 2022

(65) Prior Publication Data

US 2022/0402210 A1 Dec. 22, 2022

(30) Foreign Application Priority Data

Jun. 16, 2021 (JP) .................................. 2021-099987

(51) Int. Cl.
*B29C 64/321* (2017.01)
*B29C 45/58* (2006.01)
(Continued)

(52) U.S. Cl.
CPC ............ *B29C 64/321* (2017.08); *B29C 45/58* (2013.01); *B29C 45/76* (2013.01); *B29C 64/386* (2017.08); *B33Y 30/00* (2014.12); *B33Y 40/00* (2014.12); *B29C 2945/7618* (2013.01); *B29C 2945/76658* (2013.01)

(58) Field of Classification Search
CPC ........ B65D 88/26; B65D 90/54; B65D 90/58; B65D 90/587
See application file for complete search history.

(56) References Cited

U.S. PATENT DOCUMENTS

2008/0277423 A1\* 11/2008 Garton .................... B29C 41/38
222/561
2009/0004325 A1\* 1/2009 Bacher .................. B29C 48/285
425/586

(Continued)

FOREIGN PATENT DOCUMENTS

GB         2523313 A  *  8/2015  ........... B65D 90/587
JP    2010-241016 A    10/2010
(Continued)

*Primary Examiner* — Armand Melendez
(74) *Attorney, Agent, or Firm* — WORKMAN NYDEGGER

(57) ABSTRACT

A plasticizing device includes: a material storage unit having a charging port and configured to store pellet-shaped resin pellets; a plasticizing unit having a supply port in communication with the charging port and configured to plasticize at least a part of the resin pellets to generate a shaping material; a coupling pipe having a coupling path coupling the charging port and the supply port; a first material sensor configured to detect a remaining quantity of the resin pellets in the coupling path; and a control unit. The material storage unit includes a material supply mechanism configured to supply the resin pellets to the coupling path, and when the remaining quantity of the resin pellets detected by the first material sensor is less than a first reference value, the control unit controls the material supply mechanism to supply a predetermined quantity of the resin pellets to the coupling path.

18 Claims, 8 Drawing Sheets

(51) Int. Cl.
*B29C 45/76* (2006.01)
*B29C 64/386* (2017.01)
*B33Y 30/00* (2015.01)
*B33Y 40/00* (2020.01)

(56) References Cited

U.S. PATENT DOCUMENTS

2014/0190084 A1\* 7/2014 Schlagel ................ B65D 88/54
                                                                                  49/31
2020/0139629 A1\* 5/2020 Yokota .................. B29C 64/255
2021/0060837 A1   3/2021 Anegawa

FOREIGN PATENT DOCUMENTS

| JP | 2011011435 A | \* | 1/2011 | | |
| JP | 2021-035736 A | | 3/2021 | | |
| WO | WO-2009100919 A1 | \* | 8/2009 | ............... | B08B 5/02 |

\* cited by examiner

PLASTICIZING DEVICE, THREE-DIMENSIONAL SHAPING APPARATUS, AND INJECTION MOLDING APPARATUS

The present application is based on, and claims priority from JP Application Serial Number 2021-099987, filed Jun. 16, 2021, the disclosure of which is hereby incorporated by reference herein in its entirety.

BACKGROUND

1. Technical Field

The present disclosure relates to a plasticizing device, a three-dimensional shaping apparatus, and an injection molding apparatus.

2. Related Art

A plasticizing device for plasticizing resin pellets, which are pellet-shaped resin materials, is used for a three-dimensional shaping apparatus and an injection molding apparatus that mold a structure using the resin pellets. JP-A-2010-241016 discloses a flat screw-type plasticizing device. The plasticizing device includes a rotor formed with a spiral groove, and a barrel that abuts against an end surface of the rotor and is provided with a communication hole in a center. The rotor and the barrel face each other. The rotor is rotated by a motor. A heater is disposed in the barrel, and the resin pellets are heated and plasticized in the spiral groove.

The resin pellets that are materials are stored in a hopper. The resin pellets are supplied from the hopper to an inlet of the spiral groove provided on a side surface of the rotor.

In the plasticizing device disclosed in JP-A-2010-241016, a bridge phenomenon occurs in which the resin pellets interfere with each other and become clogged due to the weight of the resin pellets themselves until the resin pellets are supplied to the rotor. When the bridge phenomenon occurs, the resin pellets are not properly supplied to the rotor. An object of the present application is to prevent the bridge phenomenon.

SUMMARY

A plasticizing device includes: a material storage unit having a charging port and configured to store a pellet-shaped plasticizing material; a plasticizing unit having a supply port in communication with the charging port and configured to plasticize at least a part of the plasticizing material to generate a shaping material; a coupling pipe having a coupling path coupling the charging port and the supply port; a first material sensor configured to detect a remaining quantity of the plasticizing material in the coupling path; and a control unit. The material storage unit includes a material supply mechanism configured to supply the plasticizing material to the coupling path, and when the remaining quantity detected by the first material sensor is less than a first reference value, the control unit controls the material supply mechanism to supply a predetermined quantity of the plasticizing material to the coupling path.

A three-dimensional shaping apparatus includes: the plasticizing device as described above; a stage having a shaping surface; and a nozzle configured to discharge to the shaping surface the shaping material supplied from the plasticizing device.

An injection molding apparatus includes: the plasticizing device as described above; and a nozzle configured to inject to a mold the shaping material supplied from the plasticizing device.

DESCRIPTION OF EXEMPLARY EMBODIMENTS

First Embodiment

Figure 1:
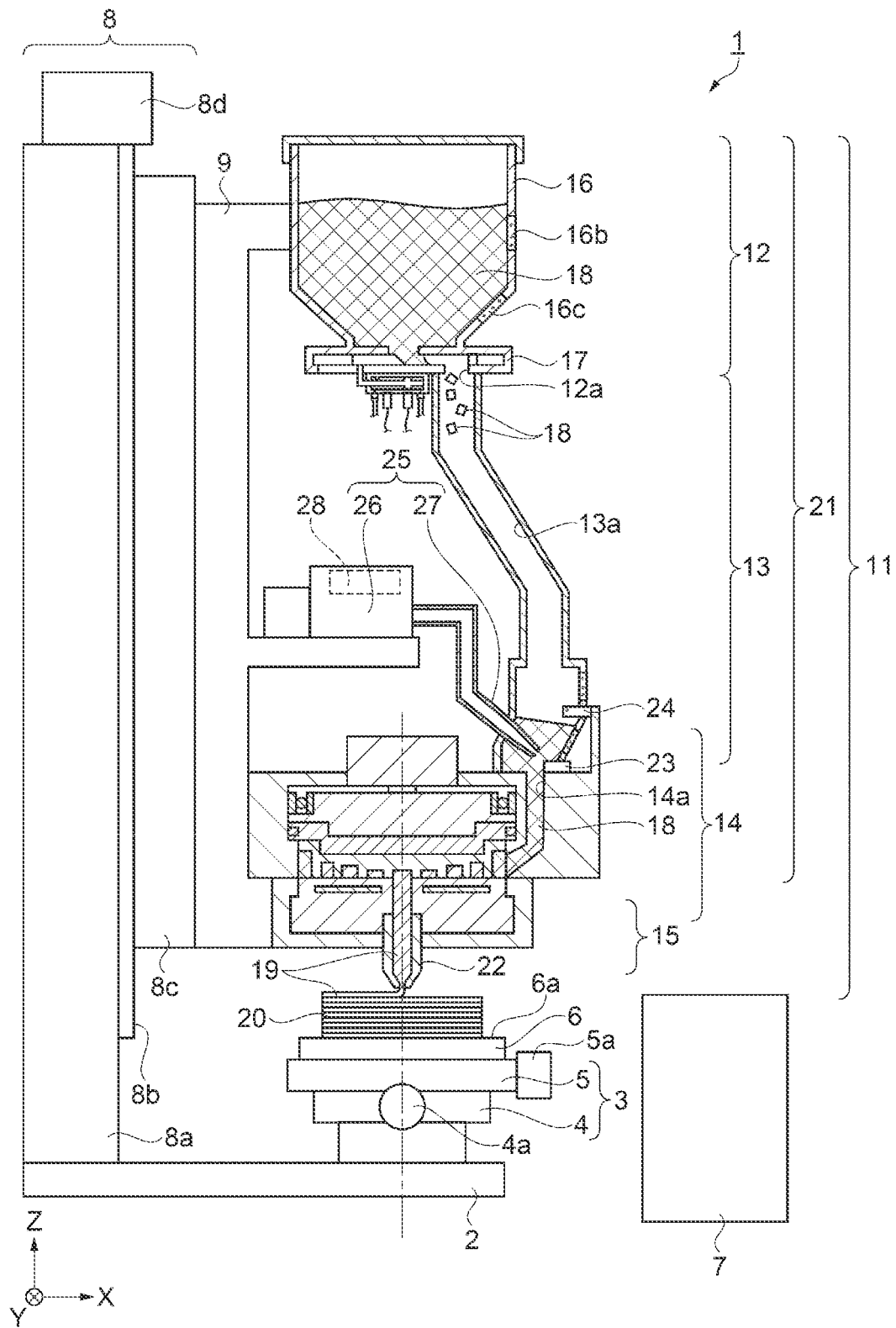
FIG. 1 is a schematic view showing a configuration of a three-dimensional shaping apparatus according to a first embodiment.

In a first embodiment, a characteristic example of a three-dimensional shaping apparatus including a plasticizing device will be described with reference to the drawings. FIG. 1 shows arrows along X, Y, and Z directions orthogonal to each other. The X direction and the Y direction are directions defined along a horizontal direction, and the Z direction is a direction defined along a vertical direction. A gravity direction is a Z negative direction.

As shown in FIG. 1, a three-dimensional shaping apparatus 1 includes a base 2. XY tables 3 that are moving units are disposed on the base 2. In the XY tables 3, a Y table 4 and an X table 5 are stacked in this order in a Z positive direction. A stage 6 is stacked on the XY tables 3.

The Y table 4 includes a Y axis motor 4a, a ball screw, a Y axis scale, and the like. The Y table 4 reciprocates the stage 6 in the Y direction. The X table includes an X axis motor 5a, a ball screw, an X axis scale, and the like. The X table 5 reciprocates the stage 6 in the X direction.

The three-dimensional shaping apparatus 1 includes a control unit 7. The control unit 7 controls movements of the Y table 4 and the X table 5. The control unit 7 identifies a position of the stage 6 in the Y direction based on information output by the Y axis scale. The control unit 7 identifies a position of the stage 6 in the X direction based on information output by the X axis scale. The control unit 7 moves the Y table 4 and the X table 5 such that a difference between a target position of moving the stage 6 and a current position is eliminated. The control unit 7 controls a trajectory of a movement of the stage 6 by sequentially changing the target position of moving the stage 6.

An elevating table 8 that is a moving unit is disposed on an X negative direction side on the base 2. The elevating table 8 includes a fixed table 8a erected on the base 2. A rail 8b is disposed on a surface of the fixed table 8a on an X positive direction side. A movement table 8c is disposed on the X positive direction side of the rail 8b. The movement table 8c reciprocates in the Z direction along the rail 8b.

A Z axis motor 8d is disposed on a Z positive direction side of the fixed table 8a. The fixed table 8a includes a ball screw and a Z axis scale inside. Similarly to the Y table 4 and the X table 5, the control unit 7 controls a trajectory of a movement of the movement table 8c. The moving unit includes the XY tables 3 and the elevating table 8.

A unit support portion 9 is disposed on the X positive direction side of the movement table 8c. A shaping unit 11 is disposed on the X positive direction side of the unit support portion 9. The unit support portion 9 supports the shaping unit 11. In the shaping unit 11, a material storage unit 12, a coupling pipe 13, a plasticizing unit 14, and a discharge unit 15 are disposed in this order in the Z negative direction.

The material storage unit 12 includes a container 16 having a cavity inside, and a material supply mechanism 17. Resin pellets 18 that are pellet-shaped plasticizing materials are stored inside the container 16. The resin pellets 18 are lumps of resin. A size of the resin pellets is not particularly limited, and in the present embodiment, the size is, for example, in a range of 5 mm to 20 mm. The material storage unit 12 includes a charging port 12a in the material supply mechanism 17. The coupling pipe 13 includes a coupling path 13a inside. The material supply mechanism 17 supplies the resin pellets 18 to the coupling path 13a. The container 16 includes a third window 16b and a fourth window 16c. The third window 16b and the fourth window 16c are made of a transparent material such as glass. The third window 16b is disposed on the Z positive direction side of the container 16. The fourth window 16c is disposed on a Z negative direction side of the container 16. A remaining quantity of the resin pellets 18 in the container 16 is observed through the third window 16b and the fourth window 16c.

The coupling pipe 13 is coupled to the charging port 12a of the material storage unit 12. The resin pellets 18 move from the inside of the material storage unit 12 into the coupling pipe 13 due to a weight thereof. The coupling pipe 13 is coupled to the plasticizing unit 14. The plasticizing unit 14 has a supply port 14a in communication with the charging port 12a. The coupling path 13a couples the charging port 12a and the supply port 14a. The resin pellets 18 are supplied from the coupling pipe 13 to the plasticizing unit 14. The resin pellets 18 may contain other materials such as metal and ceramic in addition to a thermoplastic material. In addition, when metal powder is contained in the resin pellets, not all of the resin pellets are plasticized in the plasticizing unit, and thus at least a part of the resin pellets are plasticized in the plasticizing unit.

The plasticizing unit 14 plasticizes at least a part of the resin pellets 18. A term "plasticization" is a concept including melting, and is a change from a solid to a state having fluidity. Specifically, for a material that undergoes a glass transition, the plasticization is to raise a temperature of the material to be equal to or higher than a glass transition point. For a material that does not undergo the glass transition, the "plasticization" is to raise the temperature of the material to be equal to or higher than a melting point. The plasticizing unit 14 plasticizes the resin pellets 18 to generate a shaping material 19. A plasticizing device 21 includes the material storage unit 12, the coupling pipe 13, the plasticizing unit 14, the control unit 7, and the like.

The plasticizing unit 14 is coupled to the discharge unit 15. The discharge unit 15 includes a nozzle 22. A surface of the stage 6 on the nozzle 22 side is a shaping surface 6a. The stage 6 has the shaping surface 6a. The nozzle 22 discharges the shaping material 19 supplied from the plasticizing device 21 toward the shaping surface 6a. The shaping surface 6a of the stage 6 receives the shaping material 19 discharged from the nozzle 22. While the nozzle 22 discharges the shaping material 19, the control unit 7 drives the XY tables 3 to move the stage 6 in the X direction and the Y direction. Accordingly, the three-dimensional shaping apparatus 1 forms a figure of a predetermined pattern on the stage 6. This figure is a figure of a first stage.

Next, the elevating table 8 moves the shaping unit 11 by a predetermined distance in the Z positive direction. The three-dimensional shaping apparatus 1 forms a figure of a second stage superimposed on the figure of the first stage. Further, the three-dimensional shaping apparatus 1 forms a three-dimensional structure 20 by sequentially superimposing and forming figures of a third and subsequent stages.

The plasticizing unit 14 of the plasticizing device 21 is dispose below the material storage unit 12 in the gravity direction. The elevating table 8 moves the plasticizing unit 14 and the material storage unit 12 relative to the stage 6. The elevating table 8 moves the material storage unit 12 in conjunction with movement of the plasticizing unit 14.

According to this configuration, since the plasticizing unit 14 and the material storage unit 12 are interlocked with each other, the coupling pipe 13 may not be deformed when the plasticizing unit 14 and the material storage unit 12 move. Therefore, the coupling pipe 13 can be shortened as compared with the case where the coupling pipe 13 is deformed.

The XY tables 3 move the shaping surface 6a in a direction along the shaping surface 6a. The elevating table 8 moves the plasticizing unit 14 and the material storage unit 12 in a direction perpendicular to the shaping surface 6a.

According to this configuration, the plasticizing unit 14 and the material storage unit 12 move in the gravity direction and in an opposite direction of the gravity direction. Since the plasticizing unit 14 and the material storage unit 12 have a large inertia, the plasticizing unit 14 and the material storage unit 12 can be moved faster than when they are moved along a plane orthogonal to a gravitational acceleration direction.

A first material sensor 23 and a second material sensor 24 are disposed on the plasticizing unit 14 side of the coupling path 13a. The first material sensor 23 and the second material sensor 24 detect a remaining quantity of the resin pellets 18 in the coupling path 13a. The second material sensor 24 is disposed between the first material sensor 23 and the charging port 12a. A method by which the first material sensor 23 and the second material sensor 24 detect the resin pellets 18 is not particularly limited, and in the present embodiment, for example, an optical method is adopted.

The plasticizing device 21 includes an air blower 25 between the material storage unit 12 and the plasticizing unit 14. The air blower 25 is disposed on the unit support portion 9. The air blower 25 moves up and down in conjunction with the plasticizing unit 14 and the coupling pipe 13. The air blower 25 includes a blower fan 26 and a blower nozzle 27. The blower fan 26 flows air and blows air to the blower nozzle 27. The blow nozzle 27 faces the first material sensor 23. The air blower 25 blows air from the blower nozzle 27 toward the first material sensor 23.

According to this configuration, the powdered resin pellets 18 and dust adhering to the first material sensor 23 can be blown off. Then, it is possible to prevent a decrease in sensitivity of the first material sensor 23.

The air blower 25 may include the blower nozzle that blows air toward the second material sensor 24. The powdered resin pellets 18 and dust adhering to the second material sensor 24 can be blown off. Then, it is possible to prevent a decrease in sensitivity of the second material sensor 24.

The blower fan 26 includes an ionizer 28 inside. The ionizer 28 produces a gas having a positive charge or a negative charge. The charge of the gas may be set to be positive or negative. The ionizer 28 may also generate the positive charge and the negative charge alternately. The air blower 25 blows the gas having the charge. According to this configuration, when the powdered resin pellets 18 and dust adhere to the first material sensor 23 due to static electricity, the static electricity can be removed to facilitate removal of the powdered resin pellets 18 and dust.

Figure 2:
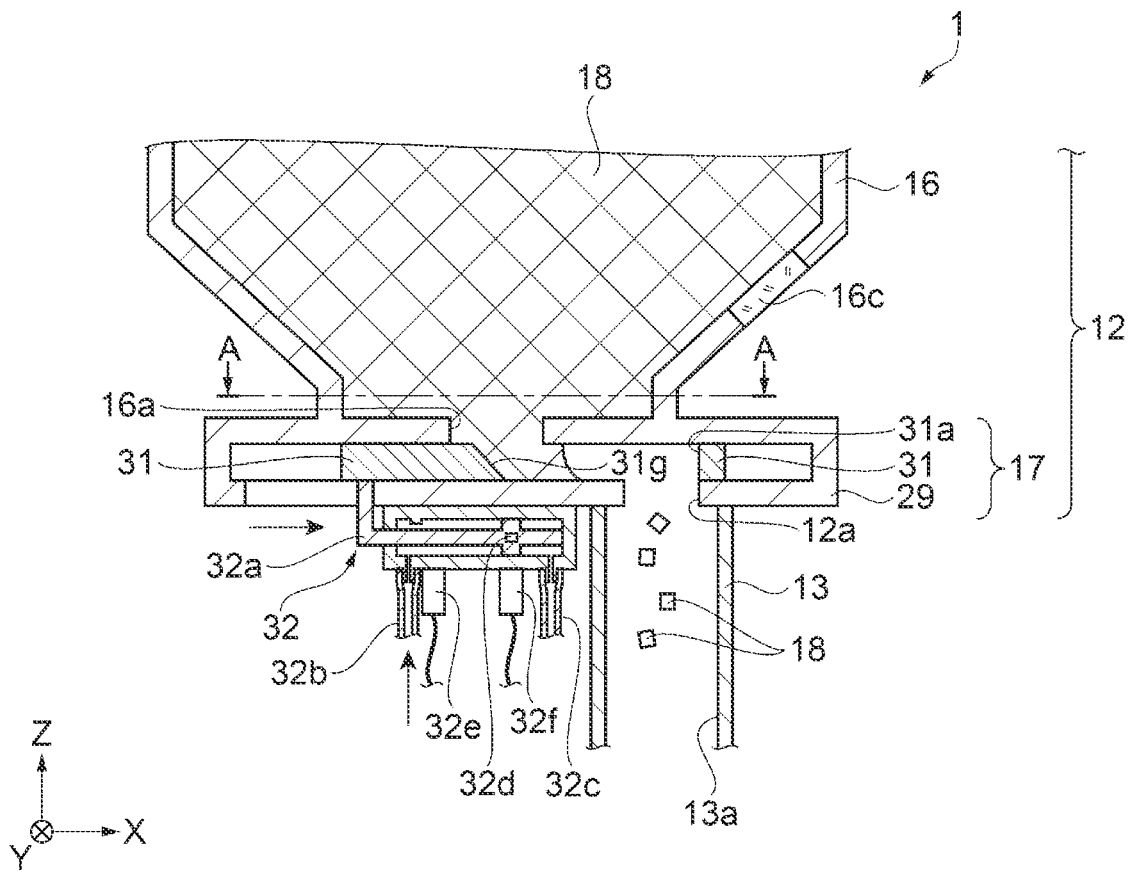
FIG. 2 is a schematic side sectional view of a main part showing a structure of a material supply mechanism.
Figure 3:
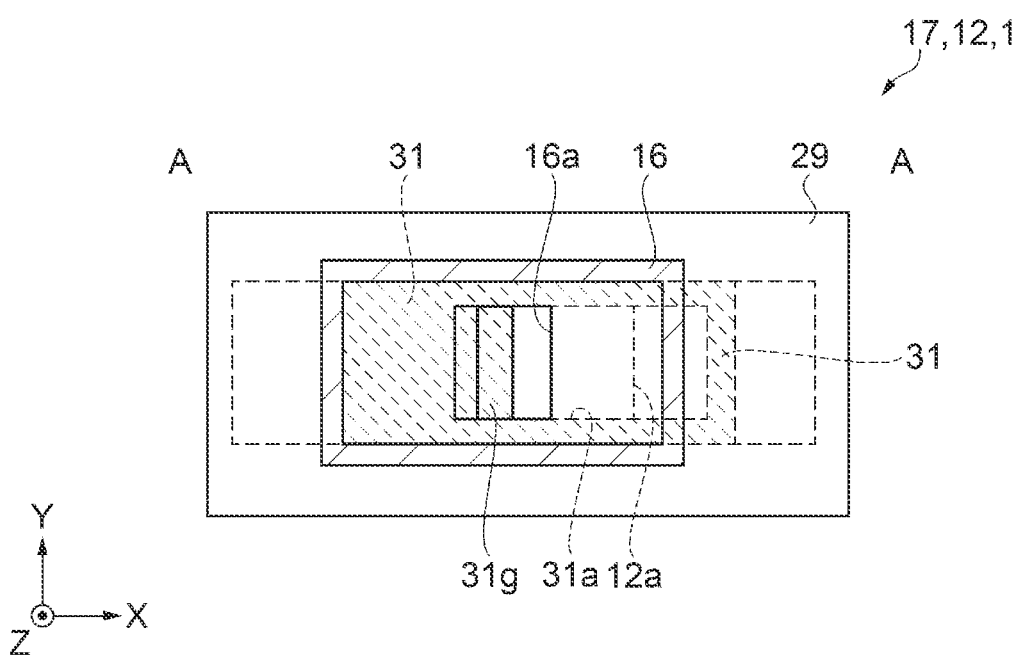
FIG. 3 is a schematic plan sectional view of the main part showing the structure of the material supply mechanism.

Next, a structure of the material supply mechanism 17 will be described with reference to FIGS. 2 to 5. FIG. 3 is a view of FIG. 2 as viewed from an AA line. FIG. 5 is a view of FIG. 4 as viewed from an AA line. As shown in FIGS. 2 and 3, the material supply mechanism 17 includes a guide case 29. An inside of the guide case 29 is hollow. The guide case 29 includes a material inlet 16a on the container 16 side. The guide case 29 includes the charging port 12a on the coupling pipe 13 side.

The guide case 29 includes a material cutting plate 31 that is a slide member inside. The material cutting plate 31 slides in the X direction inside the guide case 29 and reciprocates. The material cutting plate 31 has a cutting hole 31a as a hole. An air cylinder 32 as a slide drive unit is disposed on the Z negative direction side of the guide case 29. The air cylinder 32 includes a piston rod 32a inside. The piston rod 32a reciprocates in the X direction. One end of the piston rod 32a is fixed to the material cutting plate 31. The material cutting plate 31 is interlocked with the piston rod 32a.

The air cylinder 32 includes a first air pressure port 32b on the X negative direction side. The air cylinder 32 includes a second air pressure port 32c on the X positive direction side. When compressed air is supplied to the first air pressure port 32b, the piston rod 32a and the material cutting plate 31 move to the X positive direction side. When compressed air is supplied to the second air pressure port 32c, the piston rod 32a and the material cutting plate 31 move to the X negative direction side.

The control unit 7 includes a solenoid valve. A pipe for supplying compressed air is coupled to the solenoid valve. The solenoid valve, the first air pressure port 32b and the second air pressure port 32c are coupled by the pipe (not shown). The control unit 7 controls the solenoid valve to supply compressed air to one of the first air pressure port 32b and the second air pressure port 32c. In this way, the control unit 7 controls a moving direction of the material cutting plate 31.

The material supply mechanism 17 includes the material cutting plate 31 having the cutting hole 31a and the air cylinder 32 for sliding the material cutting plate 31. The air cylinder 32 drives the material cutting plate 31.

A magnet piece 32d is disposed on the piston rod 32a. The air cylinder 32 includes a first cylinder sensor 32e that is a third sensor on the first air pressure port 32b side. The air cylinder 32 includes a second cylinder sensor 32f that is the third sensor on the second air pressure port 32c side. When the material cutting plate moves to the X negative direction side, the first cylinder sensor 32e detects the magnet piece 32d. When the material cutting plate 31 moves to the X positive direction side, the second cylinder sensor 32f detects the magnet piece 32d. Therefore, the first cylinder sensor 32e and the second cylinder sensor 32f detect whether the material cutting plate 31 is located on the X negative direction side, the X positive direction side, or a middle point.

A state in which the material cutting plate 31 is located in the X positive direction is defined as a second state. In FIG. 3, the material cutting plate 31 is hatched by broken lines. In the second state, when viewed from the Z direction, the cutting hole 31a and the charging port 12a overlap. A part of the resin pellets 18 in the cutting hole 31a is charged into the coupling pipe 13. That is, in the second state, the resin pellets 18 in the material storage unit 12 is charged into the coupling pipe 13.

The cutting hole 31a has an inclined surface 31g on a side surface on the X negative direction side. An angle defined by the inclined surface 31g and the X direction is preferably 25 degrees or more and 35 degrees or less. This angle is called a repose angle, and is an angle at which the resin pellets 18 do not slip on the inclined surface 31g. When an angle of the inclined surface 31g is the repose angle, the resin pellets 18 stay in the cutting hole 31a, so that the resin pellets 18 do not continuously flow from the material inlet 16a to the charging port 12a. Further, it is possible to prevent the resin pellets 18 from being clogged between the material inlet 16a and the inclined surface 31g.

Figure 4:
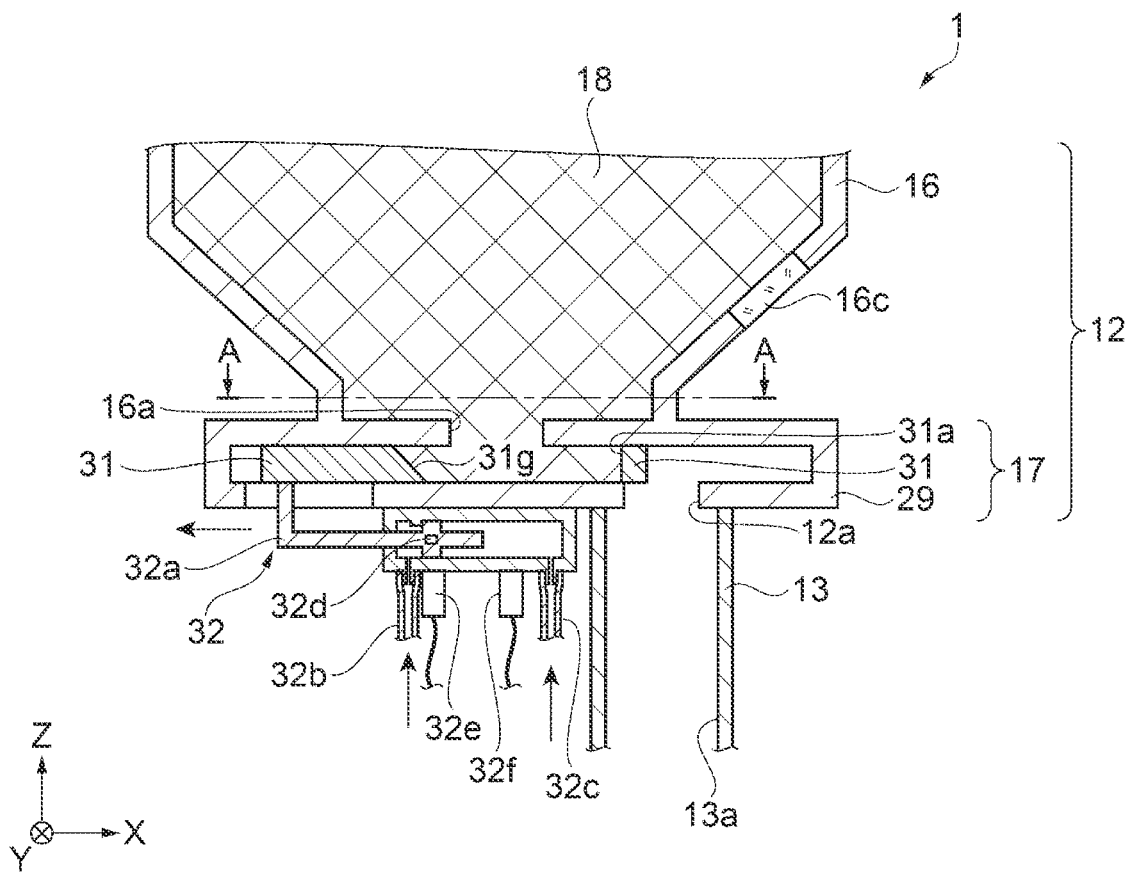
FIG. 4 is a schematic side sectional view of the main part showing the structure of the material supply mechanism.
Figure 5:
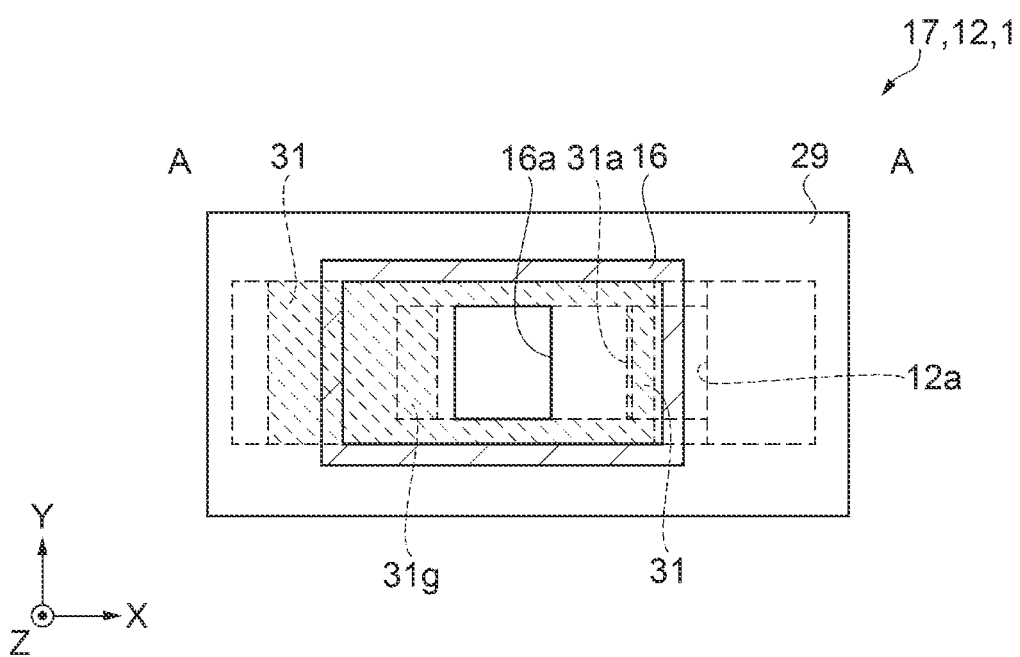
FIG. 5 is a schematic plan sectional view of the main part showing the structure of the material supply mechanism.

As shown in FIGS. 4 and 5, compressed air is supplied from the second air pressure port 32c to the air cylinder 32. The piston rod 32a moves to the X negative direction. The air cylinder 32 drives the material cutting plate 31, and the material cutting plate 31 moves to the X negative direction. A state in which the material cutting plate 31 is located in the X negative direction is defined as a first state. In FIG. 5, the material cutting plate 31 is hatched by broken lines. In the first state, when viewed from the Z direction, the cutting hole 31a and the charging port 12a do not overlap. Therefore, in the first state, the resin pellets 18 in the material storage unit 12 are not charged into the coupling pipe 13.

In the first state, when viewed from the Z direction, an area where the material inlet 16a and the cutting hole 31a overlap is larger than that in the second state. The resin pellets 18 are discharged, and charged from the material inlet 16a into a hollow portion of the cutting hole 31a. The control unit 7 drives the air cylinder 32 to switch between the first state and the second state. When the material cutting plate 31 reciprocates once, a predetermined quantity of resin pellets 18 are charged from the charging port 12a into the coupling path 13a. The control unit 7 controls the quantity of the resin pellets 18 charged into the coupling path 13a by controlling the number of times the material cutting plate 31 is reciprocated.

According to this configuration, the resin pellets 18 are charged into the cutting hole 31a in the first state. In the second state, the resin pellets 18 are charged from the cutting hole 31a into the coupling path 13a of the coupling pipe 13. Therefore, the material supply mechanism 17 can have a simple configuration using the air cylinder 32 or the like.

When the material cutting plate 31 moves to the X negative direction side, the magnet piece 32d approaches the first cylinder sensor 32e. The first cylinder sensor 32e detects the magnet piece 32d. Therefore, the first cylinder sensor 32e detects that the material cutting plate 31 is located on the X negative direction side.

The material supply mechanism 17 includes the first cylinder sensor 32e and the second cylinder sensor 32f that detect biting of the resin pellets 18 of the material cutting plate 31. When the material cutting plate 31 moves to the X negative direction side, the resin pellets are sandwiched between a side surface of the cutting hole 31a and a side surface of the charging port 12a, which is called biting. When the biting occurs, the first cylinder sensor 32e does not detect the magnet piece 32d. When the first cylinder sensor 32e does not detect the magnet piece 32d, the control unit 7 determines that the biting occurs. Then, the control unit 7 drives the air cylinder 32 to reciprocate and slide the material cutting plate 31. In this way, when the first cylinder sensor 32e detects the biting of the resin pellets 18, the air cylinder 32 performs a returning operation of sliding the material cutting plate 31.

When the material cutting plate 31 moves to the X positive direction side, the resin pellets 18 are sandwiched between the side surface of the cutting hole 31a and a side surface of the material inlet 16a, which is also called biting. When the biting occurs, the second cylinder sensor 32f does not detect the magnet piece 32d. When the second cylinder sensor 32f does not detect the magnet piece 32d even after a lapse of a predetermined time, the control unit 7 determines that the biting occurs. Then, the control unit 7 drives the air cylinder 32 to reciprocate and slide the material cutting plate 31. In this way, when the second cylinder sensor 32f detects the biting of the resin pellets 18, the air cylinder 32 performs the returning operation of sliding the material cutting plate 31.

According to this configuration, the first cylinder sensor 32e and the second cylinder sensor 32f detect the biting of the resin pellets 18. Then, the air cylinder 32 reciprocates and slides the material cutting plate 31 to eliminate the biting of the resin pellets 18. Therefore, the biting of the resin pellets 18 can be eliminated without intervention of an operator.

Figure 6:
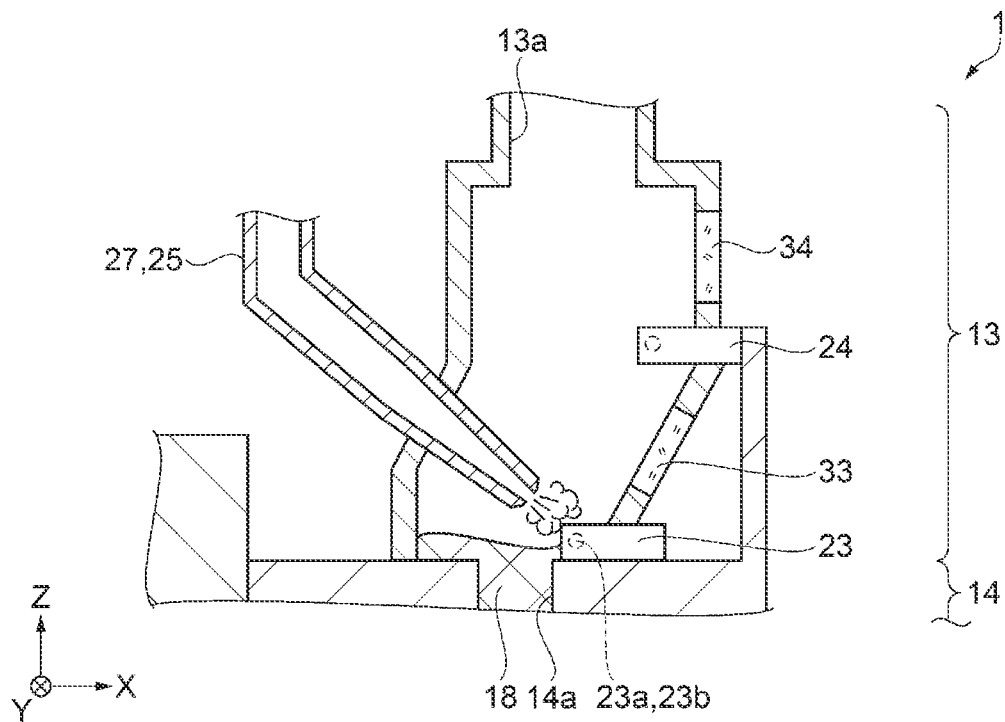
FIG. 6 is a schematic side sectional view of a main part showing a structure of a coupling pipe.

As shown in FIG. 6, the first material sensor 23 includes a first light emitting unit 23a and a first light receiving unit 23b that face each other in the Y direction. When the quantity of resin pellets 18 in the coupling pipe 13 decreases, the resin pellets 18 disappear from between the first light emitting unit 23a and the first light receiving unit 23b, so that the first light receiving unit 23b detects light emitted by the first light emitting unit 23a. At this time, the remaining quantity of the resin pellets 18 inside the coupling pipe 13 is a first reference value. The first material sensor 23 detects that the remaining quantity of the resin pellets 18 is less than the first reference value.

When the remaining quantity of the resin pellets 18 detected by the first material sensor 23 is less than the first reference value, the control unit 7 operates the material supply mechanism 17 to supply a predetermined quantity of the resin pellets 18 to the coupling path 13a.

According to this configuration, the resin pellets 18 are stored in the material storage unit 12. The coupling pipe 13 is coupled to the material storage unit 12. The material supply mechanism 17 of the material storage unit 12 supplies the resin pellets 18 to the coupling pipe 13. When the material supply mechanism 17 is not operated, the resin pellets 18 are not supplied to the coupling pipe 13. The resin pellets 18 are collected in the coupling path 13a of the coupling pipe 13. When the resin pellets 18 move to the plasticizing unit 14, the resin pellets 18 in the coupling path 13a decrease. The resin pellets 18 not used in the plasticizing unit 14 are left in the coupling path 13a of the coupling pipe 13. The first material sensor 23 detects the remaining quantity of the resin pellets 18 left in the coupling path 13a.

When the remaining quantity of the resin pellets 18 in the coupling path 13a is less than the first reference value, the control unit 7 drives the material supply mechanism 17 to supply the predetermined quantity of the resin pellets 18 to the coupling path 13a of the coupling pipe 13. Therefore, the resin pellets 18 of the coupling path 13a of the coupling pipe 13 do not exceed a quantity obtained by adding the first reference value and the predetermined quantity. The quantity obtained by adding the first reference value and the predetermined quantity is a quantity at which a bridge phenomenon does not occur. As a result, it is possible to prevent the bridge phenomenon that the resin pellets 18 interfere with each other and become clogged due to a weight of the resin pellets 18 themselves.

The coupling pipe 13 includes a first window 33 as a transparent member and a second window 34 as a transparent member. The first window 33 and the second window 34 are made of a transparent member such as glass. Therefore, the inside of the coupling pipe 13 can be visually recognized. In this way, at least a part of the coupling pipe 13 is made of the transparent member. According to this configuration, the operator can confirm the remaining quantity of the resin pellets 18 held in the coupling path 13a.

Figure 7:
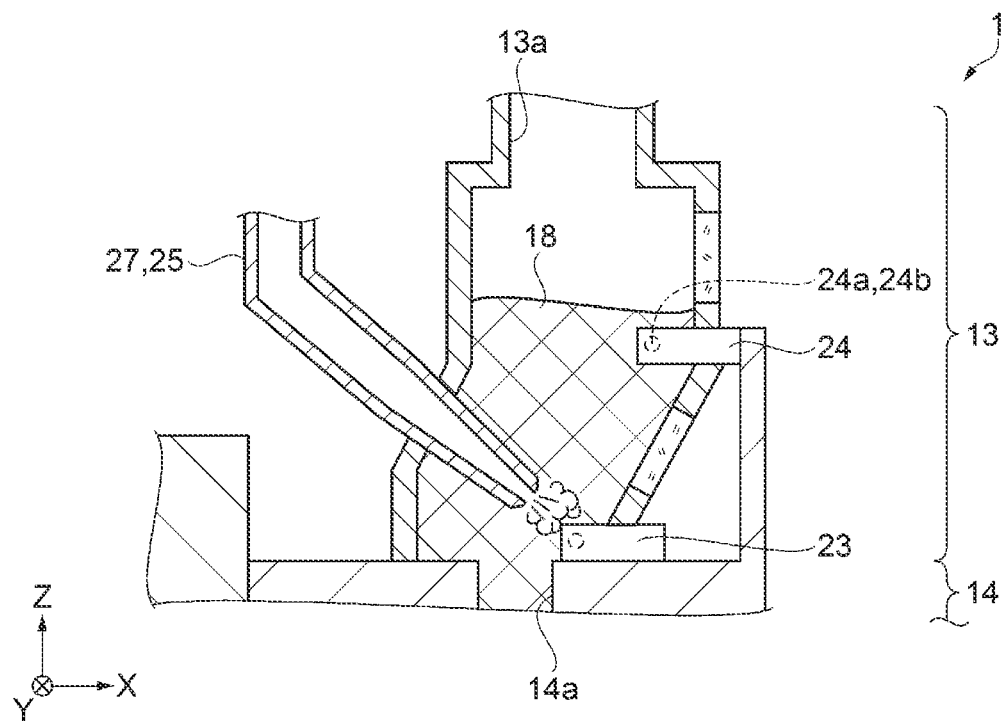
FIG. 7 is a schematic side sectional view of the main part showing the structure of the coupling pipe.

As shown in FIG. 7, the second material sensor 24 is disposed between the first material sensor 23 and the charging port 12a. The second material sensor 24 includes a second light emitting unit 24a and a second light receiving unit 24b that face each other in the Y direction. The material supply mechanism 17 supplies the resin pellets to the coupling path 13a, and the resin pellets 18 gradually increase in the coupling path 13a. When the resin pellets 18 are not present between the second light emitting unit 24a and the second light receiving unit 24b, the second light receiving unit 24b detects light emitted by the second light emitting unit 24a. When the resin pellets 18 are present between the second light emitting unit 24a and the second light receiving unit 24b, the second light receiving unit 24b does not detect the light emitted by the second light emitting unit 24a. When the resin pellets 18 are supplied to the second material sensor 24, the remaining quantity of the resin pellets 18 inside the coupling pipe 13 is a second reference value. The second material sensor 24 detects that the remaining quantity of the resin pellets 18 reached the second reference value.

In the first material sensor 23, when the first light receiving unit 23b detects the light emitted by the first light emitting unit 23a, the control unit 7 receives a signal output by the first material sensor 23, and determines that the remaining quantity of the resin pellets 18 decreased from the first reference value. At this time, the resin pellets 18 did not reach the second material sensor 24. In the second material sensor 24, the second light receiving unit 24b detects the light emitted by the second light emitting unit 24a. The control unit 7 operates the material supply mechanism 17 to supply the resin pellets 18 to the coupling path 13a.

In the second material sensor 24, when the second light receiving unit 24b does not detect the light emitted by the second light emitting unit 24a, the control unit 7 receives a signal output by the second material sensor 24, and determines that the remaining quantity of the resin pellets 18 reached the second reference value. The control unit 7 stops an operation of the material supply mechanism and stops the supply of the resin pellets 18 to the coupling path 13a.

In this way, when the remaining quantity of the resin pellets 18 detected by the first material sensor 23 is less than the first reference value, the material supply mechanism 17 supplies the resin pellets 18 up to the second reference value detected by the second material sensor 24.

Specifically, the control unit 7 receives a signal from the first material sensor 23. The signal indicates that the remaining quantity of the resin pellets is less than the first reference value. Next, the control unit 7 outputs an instruction signal for supplying the resin pellets 18 to the material supply mechanism 17. Next, the control unit 7 receives a signal from the second material sensor 24 that indicates that the resin pellets 18 were supplied up to the second reference value. Next, the control unit 7 outputs an instruction signal for stopping the supply of the resin pellets 18 to the material supply mechanism 17. In this way, the control unit 7 supplies the resin pellets 18 up to the second reference value in cooperation with the first material sensor 23, the second material sensor 24, and the material supply mechanism 17.

According to this configuration, a quantity obtained by adding a supply quantity and the remaining quantity of the resin pellet 18 supplied to the coupling path 13a by the material supply mechanism 17 can be set as the second reference value. The second reference value is a quantity at which the bridge phenomenon does not occur. The quantity obtained by adding the supply quantity and the remaining quantity of the resin pellets 18 stored in the coupling path 13a can be added up to the second reference value. Therefore, a supply frequency can be reduced as compared with a case where a small quantity of the resin pellets 18 is supplied many times.

Even when the resin pellets 18 are present between the blower nozzle 27 and the first material sensor 23, the air blower 25 may blow air toward the first material sensor 23. The air may be blown continuously or at predetermined intervals.

Figure 8:
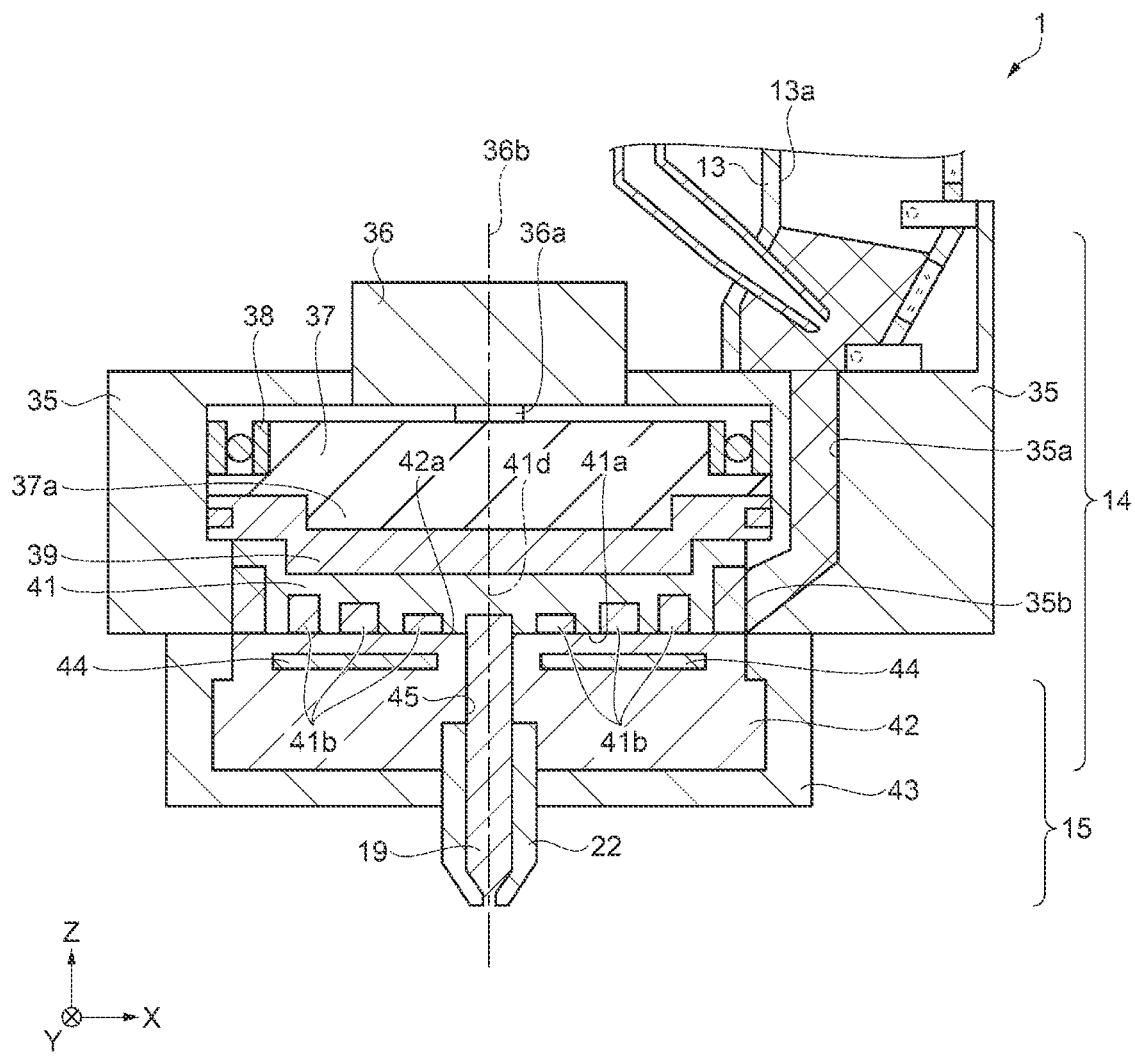
FIG. 8 is a schematic side sectional view showing a configuration of a plasticizing unit.

As shown in FIG. 8, the plasticizing unit 14 includes a screw case 35. An inside of the screw case 35 is hollow. A motor 36 is disposed on the Z positive direction side of the screw case 35. The control unit 7 controls a rotation angle, a rotation speed, a rotation start timing, and a rotation stop timing of the motor 36.

A reduction gear 37 is coupled to a rotation shaft 36a of the motor 36. When the rotation shaft 36a rotates at a high speed, an outer peripheral side of the reduction gear 37 rotates at a reduced low speed. The outer peripheral side of the reduction gear 37, which rotates at the low speed, serves as an output shaft 37a. A bearing 38 is disposed on the outer peripheral side of the reduction gear 37. The bearing 38 is disposed between the screw case 35 and the reduction gear 37. The bearing 38 rotatably supports the reduction gear 37.

A screw support portion 39 is disposed at the output shaft 37a of the reduction gear 37. A flat screw 41 is disposed at the screw support portion 39. The flat screw 41 rotates in synchronization with the output shaft 37a. The flat screw 41 is rotated by the motor 36. A screw rotation center 41d, which is a rotation center of the flat screw 41, is coaxial with a motor rotation center 36b, which is a rotation center of the motor 36.

Figure 9:
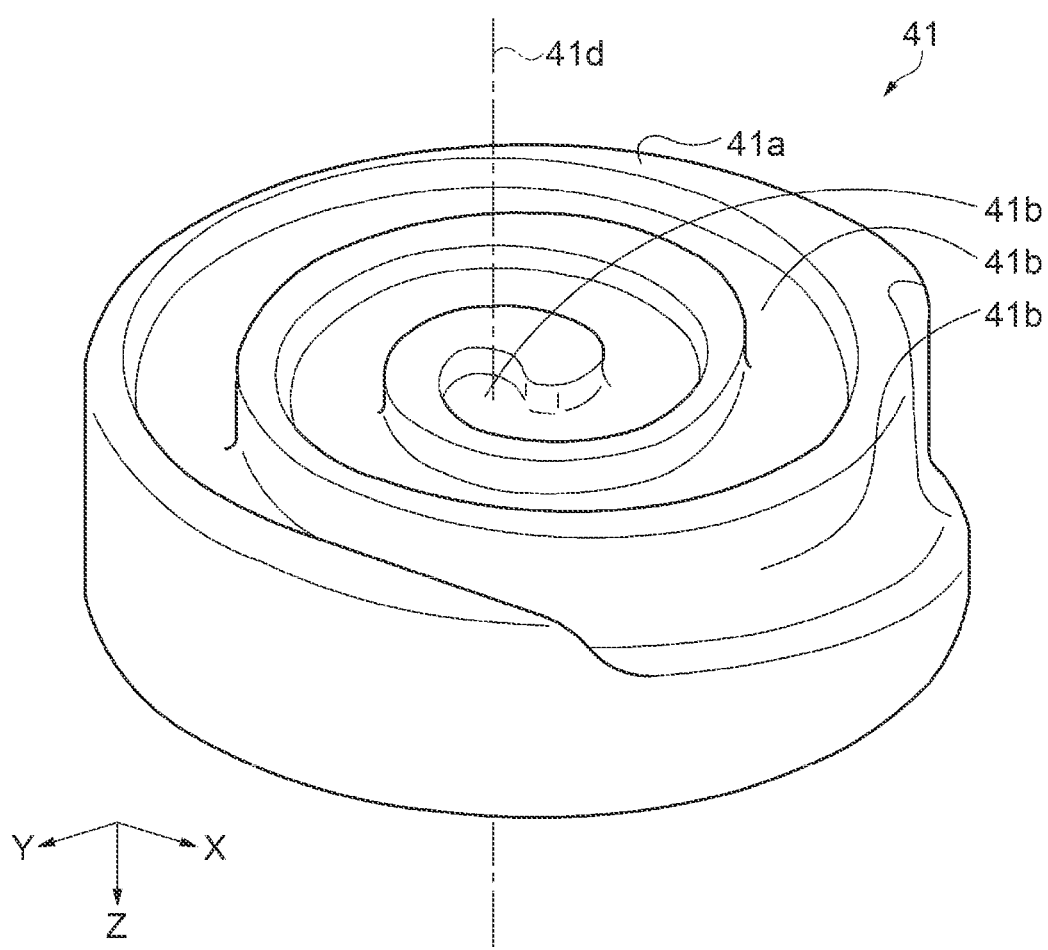
FIG. 9 is a schematic perspective view showing a configuration on a groove forming surface side of a flat screw.

As shown in FIGS. 8 and 9, the flat screw 41 is provided with a groove forming surface 41a on which spiral grooves 41b are formed. The flat screw 41 has a substantially cylindrical shape in which a size in a rotation shaft 36a direction is smaller than a size in a direction orthogonal to the rotation shaft 36a direction. In the shown example, one groove 41b coupled in a spiral shape is provided. The number of the grooves 41b is not particularly limited. Although not shown, two or more grooves 41b may be provided.

The screw case 35 accommodates the reduction gear 37, the screw support portion 39, and the flat screw 41. The screw case 35 has a supply path 35a coupled to the coupling pipe 13. The supply path 35a extends from the coupling pipe 13 to the flat screw 41. An opening of the supply path 35a on a flat screw 41 side is a passage port 35b. The screw case 35 is provided with the passage port 35b through which the resin pellets 18 pass toward the flat screw 41.

A barrel 42 is disposed on a Z negative direction side of the flat screw 41. A barrel case 43 that accommodates the barrel 42 is disposed on the Z negative direction side of the screw case 35. The flat screw 41 rotates with respect to the barrel 42.

Figure 10:
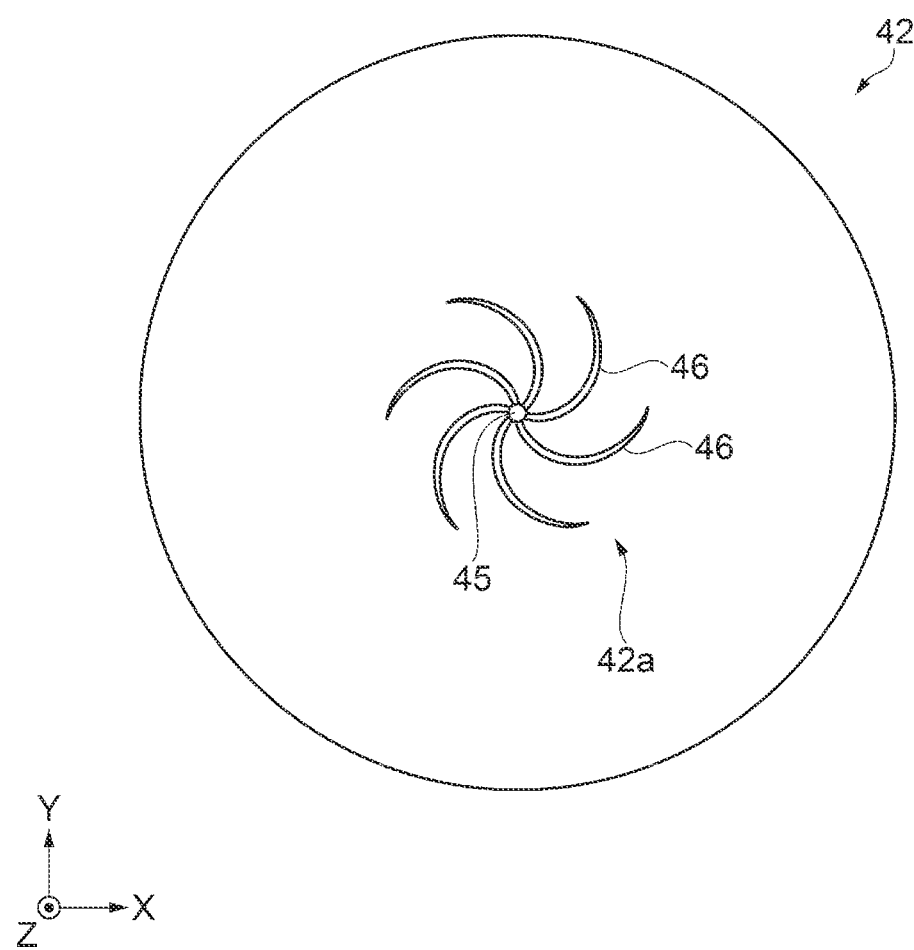
FIG. 10 is a schematic plan view showing a configuration on an opposing surface side of a barrel facing the flat screw.

As shown in FIGS. 8 and 10, the barrel 42 has an opposing surface 42a facing the groove forming surface 41a. A heater 44 is disposed inside the barrel 42 at a position facing the grooves 41b. The heater 44 heats the resin pellets 18 supplied between the groove forming surface 41a and the opposing surface 42a. The heated resin pellets 18 are plasticized into the shaping material 19. The barrel 42 is provided with a communication hole 45 through which the shaping material 19 obtained by plasticizing the resin pellets 18 flows.

A plurality of guide grooves 46 are formed around the communication hole 45 in the opposing surface 42a. One end of each guide groove 46 is coupled to the communication hole 45, and the guide grooves 46 extend in a spiral shape from the communication hole 45 toward an outer periphery of the opposing surface 42a. Each guide groove 46 guides the shaping material 19 to the communication hole 45. One end of each guide groove 46 may not be coupled to the communication hole 45, and the guide grooves 46 may not be formed in the opposing surface 42a.

A depth of the grooves 41b in the flat screw 41 is smaller on a side closer to the screw rotation center 41d than on the outer peripheral side. Therefore, a cross-sectional area of the grooves 41b is smaller on the side closer to the screw rotation center 41d than on the outer peripheral side. The shaping material 19 in the grooves 41b exerts a high pressure on a screw rotation center 41d side and is pushed out to the communication hole 45. The flat screw 41 functions as a pump that moves the shaping material 19.

According to this configuration, since the plasticizing unit 14 includes the flat screw 41 and the barrel 42, a size of the plasticizing unit 14 can be smaller than a plasticizing unit including an in-line screw.

According to this configuration, the three-dimensional shaping apparatus 1 includes the plasticizing device 21. The plasticizing device 21 can prevent the occurrence of the bridge phenomenon. Therefore, the three-dimensional shaping apparatus 1 can supply the resin pellets 18 to the plasticizing unit 14 for a long time.

Second Embodiment

The present embodiment describes an example of an injection molding apparatus including the plasticizing device 21 of the first embodiment.

Figure 11:
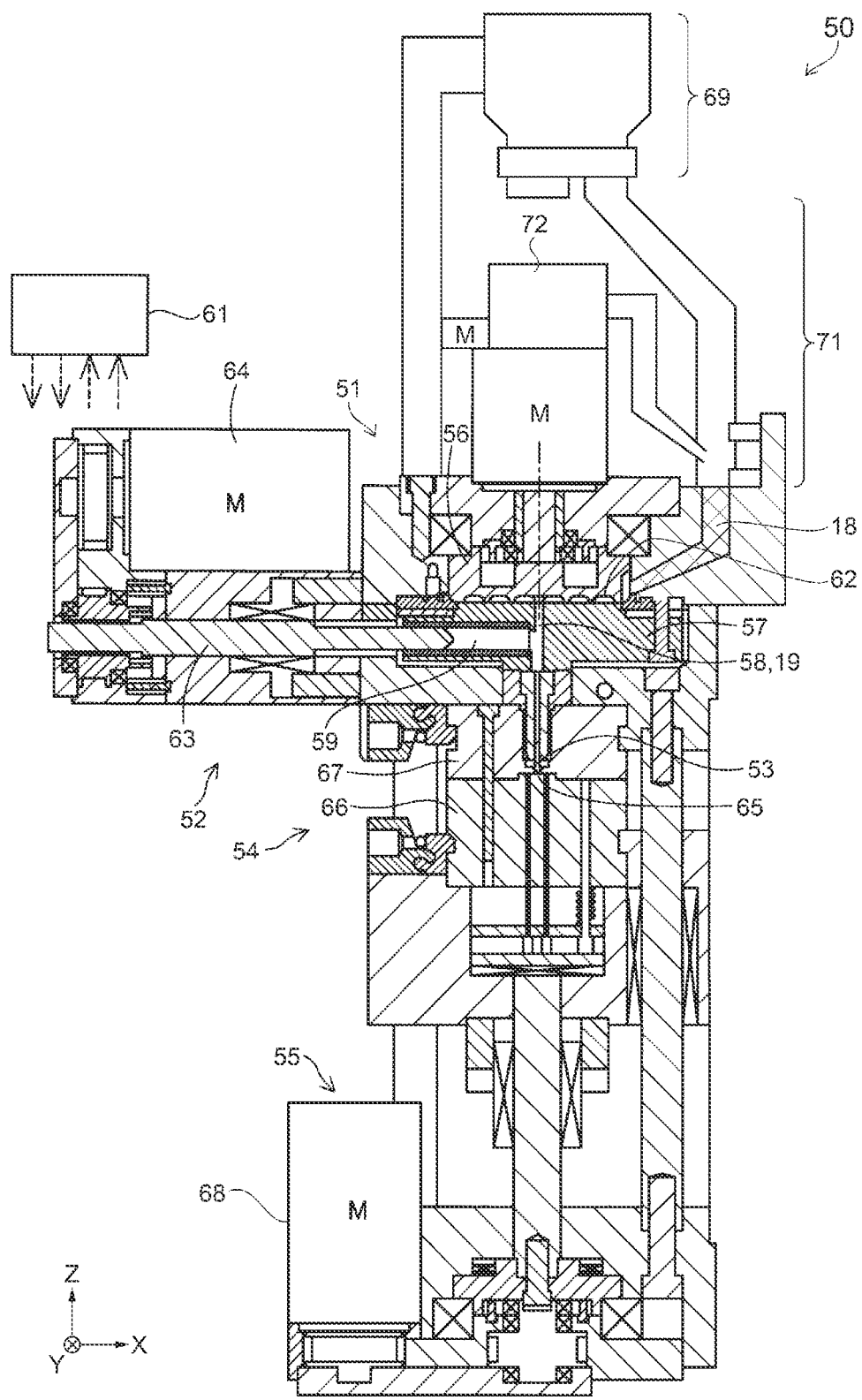
FIG. 11 is a schematic view showing a configuration of an injection molding apparatus according to a second embodiment.

As shown in FIG. 11, an injection molding apparatus 50 includes a plasticizing device 51, an injection control mechanism 52, a nozzle 53, a mold 54, and a mold clamping device 55. The plasticizing device 21 of the first embodiment is used for the plasticizing device 51.

The plasticizing device 51 includes a flat screw 56 and a barrel 57. An injection cylinder 59 is coupled to a communication hole 58 of the barrel 57. Under control of a control unit 61, the plasticizing device 51 plasticizes the resin pellets 18 supplied to groove portions 62 of the flat screw 56, generates the pasty shaping material 19 having fluidity, and guides the shaping material 19 from the communication hole 58 to the injection control mechanism 52.

In addition, the plasticizing device 51 includes a material storage unit 69, a coupling pipe 71, and an air blower 72. The material storage unit 69, the coupling pipe 71, and the air blower 72 correspond to the material storage unit 12, the coupling pipe 13, and the air blower 25 of the first embodiment, respectively.

The injection control mechanism 52 includes the injection cylinder 59, a plunger 63, and a plunger drive unit 64. The injection control mechanism 52 injects the shaping material 19 in the injection cylinder 59 into a cavity 65. The injection control mechanism 52 controls an injection quantity of the shaping material 19 injected from the nozzle 53 under the control of the control unit 61. The injection cylinder 59 is a substantially cylindrical member coupled to the communication hole 58 of the barrel 57, and includes the plunger 63 inside. The plunger 63 slides inside the injection cylinder 59, and pumps the shaping material 19 in the injection cylinder 59 to the nozzle 53 coupled to the plasticizing device 51. The plunger 63 is driven by the plunger drive unit 64 constituted by the motor.

The mold 54 includes a movable mold 66 and a fixed mold 67. The movable mold 66 and the fixed mold 67 face each other, so that the cavity 65, which is a space corresponding to a shape of a molded product, is defined between the movable mold 66 and the fixed mold 67. The shaping material 19 pumped by the injection control mechanism 52 is injected into the cavity 65 through the nozzle 53.

The mold clamping device 55 includes a mold drive unit 68. The mold drive unit 68 opens and closes the movable mold 66 and the fixed mold 67. Under the control of the control unit 61, the mold clamping device 55 drives the mold drive unit 68 to move the movable mold 66 to open and close the movable mold 66 and the fixed mold 67.

In the injection molding apparatus 50, the plasticizing device 21 of the first embodiment is used for the plasticizing device 51. The injection molding apparatus 50 includes the nozzle 53 that injects the shaping material 19 supplied from the plasticizing device 51 toward the mold 54.

According to this configuration, the injection molding apparatus 50 includes the plasticizing device 21 as the plasticizing device 51. The plasticizing device 21 can prevent the occurrence of the bridge phenomenon of the resin pellets 18. Therefore, the plasticizing device 51 can supply the shaping material 19 to the nozzle 53 for a long time.

Third Embodiment

In the first embodiment, the XY tables 3 move the stage 6 in the X direction and the Y direction. The elevating table 8 moves the discharge unit 15 in the Z direction. In addition, an elevating table that moves the stage 6 in the Z direction and XY tables that move the discharge unit 15 in the X direction and the Y direction may be provided. Further, the stage 6 may be provided with XYZ tables that do not move or move the discharge unit 15 in the X direction, the Y direction, and the Z direction. Furthermore, the discharge unit 15 may be provided with XYZ tables that do not move or move the stage 6 in the X direction, the Y direction, and the Z direction. In any form, the three-dimensional structure 20 can be formed on the stage 6.

What is claimed is:

1. A plasticizing device comprising:
   a material storage unit having a container configured to store a pellet-shaped plasticizing material and a material supply mechanism configured to supply the plasticizing material to an outside, the material supply mechanism including a guide case having a material inlet on a container side and a charging port on an opposite side from the container and inside of the guide case being hollow;
   a plasticizing unit having a supply port in communication with the charging port and configured to plasticize at least a part of the plasticizing material to generate a shaping material;
   a coupling pipe having a coupling path through which the pellet-shaped plasticizing material falls from the charging port to the supply port;
   a first material sensor configured to detect a remaining quantity of the plasticizing material in the coupling path; and
   a control unit, wherein
   the material supply mechanism includes a slide member being provided inside the guide case and having a hole, and a slide drive unit configured to slide the slide member inside the guide case, and
   when the remaining quantity detected by the first material sensor is less than a first reference value, the control unit controls the material supply mechanism to supply a predetermined quantity of the plasticizing material to the coupling path, wherein
   when viewed from a first direction perpendicular to a second direction in which the slide member slides, the material inlet does not overlap the charging port, and
   the slide drive unit drives the slide member to switch between a first state, in which the plasticizing material in the material storage unit is not charged into the coupling pipe, and a second state in which the plasticizing material in the material storage unit is charged into the coupling pipe, and
   the hole provided in the slide member has a first side surface and a second side surface that is closer to the charging port than the first side surface in the second direction, and the first side surface is inclined so that a size of the hole becomes smaller in the first direction.

2. The plasticizing device according to claim 1, further comprising: a second material sensor disposed between the first material sensor and the charging port, wherein
   when the remaining quantity detected by the first material sensor is less than the first reference value, the control unit controls the material supply mechanism to supply the plasticizing material up to a second reference value detected by the second material sensor.

3. The plasticizing device according to claim 1, wherein
   the material supply mechanism includes a third sensor configured to detect biting of the plasticizing material in the slide member, and
   when the third sensor detects the biting of the plasticizing material, the slide drive unit performs a returning operation of sliding the slide member.

4. The plasticizing device according to claim 1, further comprising:
   an air blower configured to blow air toward the first material sensor.

5. The plasticizing device according to claim 4, wherein the air blower blows a gas having a charge.

6. The plasticizing device according to claim 1, wherein the plasticizing unit includes:

a motor;

a flat screw having a groove forming surface at which a spiral groove is formed and configured to be rotated by the motor; and a barrel having an opposing surface facing the groove forming surface and provided with a communication hole through which the shaping material flows.

7. The plasticizing device according to claim 1, wherein at least a part of the coupling pipe is made of a transparent member.

8. A three-dimensional shaping apparatus comprising:

the plasticizing device according to claim 1;

a stage having a shaping surface; and a nozzle configured to discharge the shaping material supplied from the plasticizing device toward the shaping surface.

9. The three-dimensional shaping apparatus according to claim 8, wherein the plasticizing unit of the plasticizing device is disposed below the material storage unit in a gravity direction, the three-dimensional shaping apparatus further includes a moving unit configured to move the plasticizing unit and the material storage unit relative to the stage, and the moving unit moves the material storage unit in conjunction with movement of the plasticizing unit.

10. The three-dimensional shaping apparatus according to claim 9, wherein the moving unit moves the shaping surface in a direction along the shaping surface, and moves the plasticizing unit and the material storage unit in a direction perpendicular to the shaping surface.

11. An injection molding apparatus comprising:

the plasticizing device according to claim 1; and a nozzle configured to inject to a mold the shaping material supplied from the plasticizing device.

12. The plasticizing device according to claim 1, wherein a total of the predetermined quantity and the first reference value is less than a quantity at which a bridge phenomenon does not occur in the coupling pipe.

13. The plasticizing device according to claim 1, wherein

The first side surface is inclined at an angle at which the pellet-shaped plasticizing material do not slip.

14. The plasticizing device according to claim 3, wherein when the third sensor detects the biting of the plasticizing material, the slide drive unit performs the returning operation of reciprocates sliding the slide member back and forth.

15. The plasticizing device according to claim 1, wherein when viewed from the first direction, an area where the material inlet and the hole provided in the slide member overlap in the first state is larger than an area where the material inlet and the hole provided in the slide member overlap in the second state.

16. The plasticizing device according to claim 1, wherein in the first state, the plasticizing material stored in the container is supplied to the hole provided in the slide member from the material inlet, and in the second state, the plasticizing material in the hole provided in the slide member is supplied to the charging port.

17. The plasticizing device according to claim 1, wherein the container has a first window and a second window each made of a transparent member, and the first window and the second window are arranged along the first direction.

18. The plasticizing device according to claim 1, wherein the slide drive unit includes a piston rod reciprocating about an axis along the second direction by air, and fixed to the slide member, and a first magnet piece and a second magnet piece are installed on the piston rod along the second direction, and the slide drive unit includes a first sensor that detects the first magnet piece and a second sensor that detects the second magnet piece.

* * * * *